United States Patent [19]
Clarke

[11] Patent Number: 4,754,647
[45] Date of Patent: Jul. 5, 1988

[54] SEMICONDUCTOR INTEGRATED PRESSURE TRANSDUCER

[75] Inventor: David A. Clarke, Eastleigh, United Kingdom

[73] Assignee: International Business Machines Corporation, Armonk, N.Y.

[21] Appl. No.: 102,455

[22] Filed: Sep. 29, 1987

[30] Foreign Application Priority Data

Mar. 10, 1986 [GB] United Kingdom ............... 8623798

[51] Int. Cl.$^4$ ........................... G01L 7/08; G01L 9/00
[52] U.S. Cl. ...................................... 73/723; 73/729; 73/754; 200/81.4; 200/81.6; 200/83 R
[58] Field of Search ................. 73/723, 729, 753, 754, 73/DIG. 4, 386, 384; 200/81.6, 81.4, 83 R

[56] References Cited

U.S. PATENT DOCUMENTS

| | | | |
|---|---|---|---|
| 3,271,543 | 9/1966 | Schonfeld | 200/81.6 |
| 3,727,017 | 4/1973 | Schlesman | 200/81.6 |
| 4,000,652 | 1/1977 | Wiklund | 73/729 |

FOREIGN PATENT DOCUMENTS 0191408  2/1923  United Kingdom ................. 73/723

Primary Examiner—Donald O. Woodiel
Attorney, Agent, or Firm—Otto Schmid, Jr.

[57] ABSTRACT

A semiconductor integrated pressure transducer in which a semiconductor substrate incorporates a hermetically sealed system comprising a first chamber communicating with a second chamber via a capillary. The first chamber contains a fluid and has at least one portion of a wall in the form of a deformable membrane separating the atmosphere within the chamber from that external to the sensor. The second chamber contains a compressible gas and has rigid walls. The capillary is partially filled with electrically conducting liquid, and the liquid physically separates the fluid in the first chamber from the gas in the second chamber. The wall of the capillary is electrically conductive at least in two separated regions such that in use, at a predetermined external atmosphere pressure, the electrically conductive liquid makes contact with both electrically conductive regions thereby completing an electrical circuit.

4 Claims, 3 Drawing Sheets

SEMICONDUCTOR INTEGRATED PRESSURE TRANSDUCER

BACKGROUND OF THE INVENTION

1. Field of the Invention

The present invention relates to a semiconductor integrated pressure transducer and a method for fabricating such a transducer.

2. Description of the Prior Art

It is known in the art to integrate pressure transducers with Metal Oxide Silicon (MOS) circuitry, in particular, piezo resistive pressure sensitive devices are known, but have not been adopted because of the lack of sufficient amplitude of signal for ready detection and processing.

A further type of semiconductor integrated pressure transducer is disclosed in European Patent No. EP-B-0049344. The transducer disclosed in No. EP-B-0049344 is a capacitive pressure transducer characterized in that it comprises an electrically conductive diaphragm of semiconductor material surrounded and supported by a body of semiconductor material, a perforated electrically conductive membrane so supported by the body of semiconductor material that it is spaced from the diaphragm to form a hollow between the membrane and the diaphragm, the diaphragm and the membrane respectively serving as the movable plate and the fixed plate of a capacitor, the capacitance of which varies in dependence on the pressures on opposite sides of the diaphragm.

SUMMARY OF THE INVENTION

It is therefore the principal object of the present invention to provide a device enabling the direct digital output of the analogue quantity, pressure, to a high precision.

According to the present invention there is provided a semiconductor integrated pressure transducer in which a semiconductor substrate incorporating a hermetically sealed system comprises a first chamber communicating with a second chamber via a capillary. The first chamber contains a fluid and at least one portion of a wall of the first chamber is in the form of a deformable membrane which separates the atmosphere within the chamber from that external to the sensor. The second chamber has rigid walls and contains a compressible gas. The capillary is partially filled with an electrically conducting liquid, and the liquid physically separates the fluid in the first chamber from the gas in the second chamber. The wall of the capillary is electrically conductive at least in two separated regions such that, in use at a predetermined external atmosphere pressure, the electrically conductive liquid makes contact with both electrically conductive regions thereby completing an electrical circuit.

The electrical circuit completed by the electrically conductive liquid may be part of a switching circuit for a pressure measurement device or a pressure threshold switch.

Suitably for pressure measurement the wall of the capillary is formed with a plurality of separated electrically conductive regions such that in use the electrically conductive liquid will at a number of predetermined positions make contact with two or more of the electrically conductive regions.

The electrically conductive liquid must be repellent to the semiconductor substrate and any surfaces forming all or part of the inner surface of the capillary to avoid adhesion to the walls of the capillary. Suitable electrically conductive liquids include aqueous ionic solutions or mercury. In the case where the electrically conductive liquid is an aqueous ionic solution, the electrical circuit completed by the liquid is suitably an AC circuit thereby avoiding electrolysis of the solution and the problems associated therewith.

The first chamber, i.e. the chamber having at least one portion of the wall in the form of a deformable membrane, acts as the sensing chamber and is filled with liquid or gas which is electrically non-conductive. The gas or liquid is inert to the deformable membrane, semiconductor substrate and the electrically conductive liquid.

The second chamber acts as a ballast chamber and is filled with compressible gas; the gas is electrically non-conductive and inert to the semiconductor substrate and the electrically conductive liquid.

Preferably both the first and second chamber contain gas, and preferably contain the same gas such as, for example, nitrogen or argon.

The pressure transducer is made as part of an integrated circuit structure, the circuitry of which utilizes the change of status of the electrical circuit completed by the electrically conductive liquid.

The foregoing and other objects, features and advantages of the invention will be apparent from the following more particular description of a preferred embodiment of the invention as illustrated in the accompanying drawings.

BRIEF DESCRIPTION OF THE DRAWINGS

How the invention can be carried out will now be described by way of example only, with reference to the accompanying drawings, in which.

DESCRIPTION OF THE PREFERRED EMBODIMENTS

Figure 1:
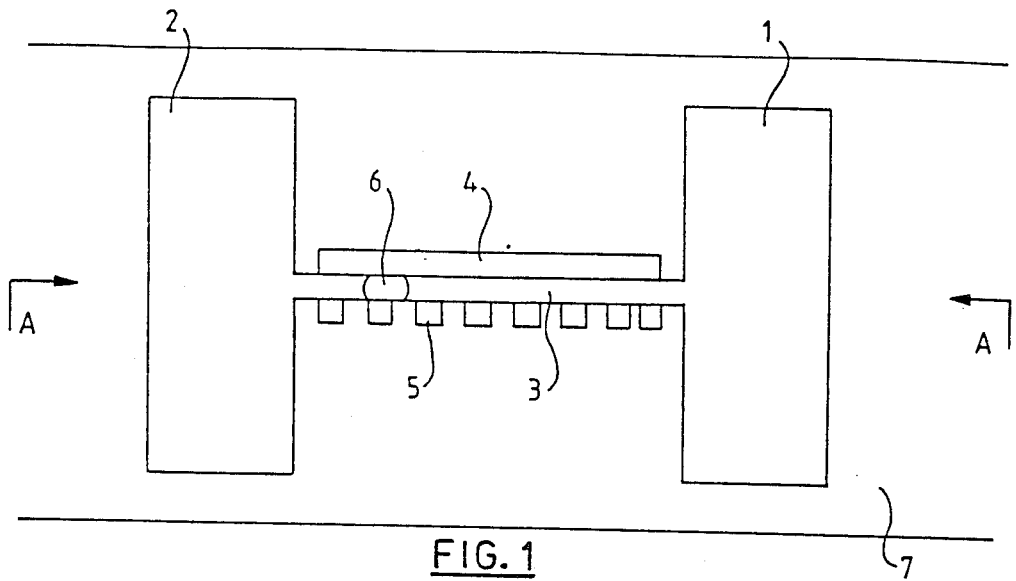
FIG. 1 is a schematic plan view of a pressure transducer according to the invention.

Referring initially to FIG. 1 of the drawings, the pressure transducer comprises a silicon substrate incorporating a hermetically sealed system 1, 2, 3. The hermetically sealed system comprises a first chamber 1 communicating with s second chamber 2 via a capillary 3.

Figure 2:
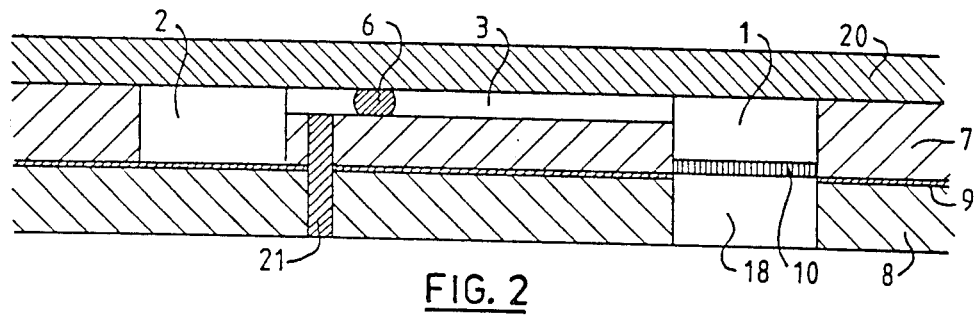
FIG. 2 is a schematic diagram of a cross section along line A—A of FIG. 1.
Figure 3:
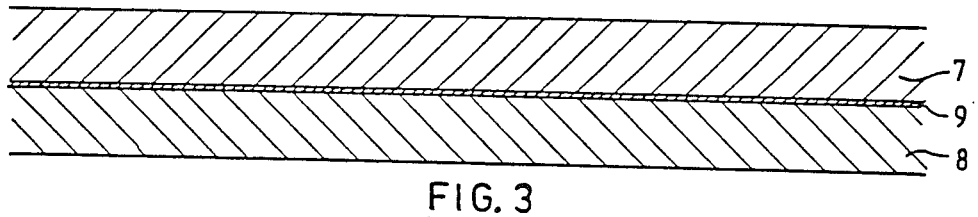
FIGS. 3 to 9 are schematic diagrams of a cross section of a pressure transducer according to FIG. 2 as it evolves during fabrication.

FIG. 2 shows the first chamber 1 having at least one portion of the wall in the form of a deformable membrane 10 of silicon dioxide. The substrate is shown as three distinct layers, an upper layer of epitaxial silicon 7, a middle layer of silicon 9 heavily doped with boron for reasons which will become apparent later, and a third layer being a silicon wafer 8. One wall of the first chamber 1, second chamber 2 and the capillary 3 is formed by a glass plate 20 fixed to the upper epitaxial silicon layer 7 by a charge depletion process. The electrically conductive liquid 6 is shown having a spheroidal shape as would be expected for a liquid repellent to the silicon substrate 7 and glass plate 20. The middle layer of silicon 9 is shown discontinued in the region of the deformable membrane 10; however, this is not essential and the silicon layer 9 may form part of the membrane 10. Hermetic sealing of the system after fabrication is achieved by fabrication of plug 21 during the final stage of manufacture.

Referring again to FIG. 1 the electrically conductive liquid 6 is shown within the capillary 3 forming an electrically conductive link between a conductor 4 and one of a number of conductors 5. The remaining parts of the circuit connecting conductor 4 and conductors 5 are not shown and are incorporated in the silicon substrate by conventional fabrication techniques. Conductors 4 and 5 are formed by conventional doping or deposition techniques used in integrated circuit fabrication.

The process of manufacture of the device of the invention will be outlined with reference to FIGS. 3 to 7. The same reference numerals will be used as in FIGS. 1 and 2.

The first stage in the process is the manufacture of the integrated circuit portion by conventional techniques which need not be described in detail. FIG. 2 shows a portion of the silicon wafer prepared for fabrication of the device of the invention. The upper surface of a silicon wafer 8 is highly doped with boron to give an etch stop layer 9. An epitaxial layer 7 of silicon is grown over the etch stop layer 9.

Figure 4:
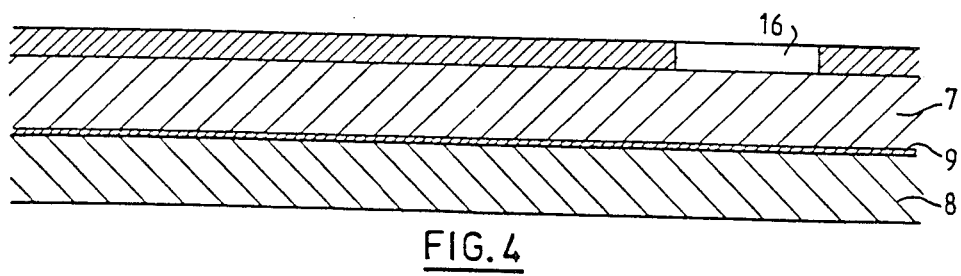

The further steps in manufacture as follows:

The wafer is coated with a commercially available sensitized lacquer resist and dried. After alignment of the wafer with a mask, the photoresist 11 is exposed and developed to leave a window 16 in the photoresist 11 as shown in FIG. 4. The window 16 defines the position of the chamber 1.

After oven baking to harden the resist, the epitaxial silicon layer is etched in silicon etchant. A suitable silicon etchant is hot (118° C.) aqueous solution of ethylene diamine and pyrocatechol. The depth of the etching is limited by the etch stop layer 9.

Figure 5:
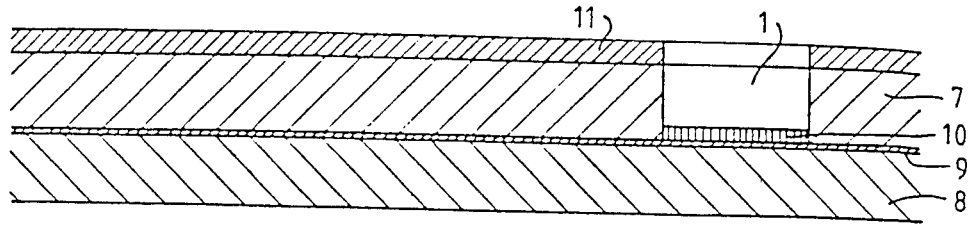

The wafer is rinsed and dried in a conventional manner and a silicon dioxide layer grown over the wafer to effectively give a layer 10 of silicon dioxide within the chamber 1 on the etch stop layer 9 as shown in FIG. 5. The silicon dioxide layer 10 will ultimately serve as a flexible membrane.

Figure 6:
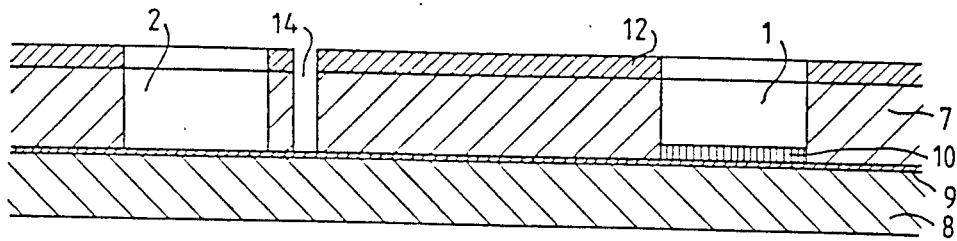

The resist layer is removed in a conventional manner and replaced by a resist 12 which is processed by photolithographic techniques to define a new set of windows. FIG. 6 shows the wafer after treatment with silicon etchant as described above. Chamber 2 and the upper portion 14 of a charging hole are etched to a depth dictated by the etch stop layer 9. The silicon dioxide layer 10 is relatively inert to the silicon etchant and remains essentially intact.

The resist layer 12 is removed and replaced by a mask defining the layout of the conductors 4 and 5 (not shown) and the epitaxial layer doped with an appropriate agent to give the conductors 4 and 5 linking with the circuitry in the silicon substrate (not shown).

Figure 7:
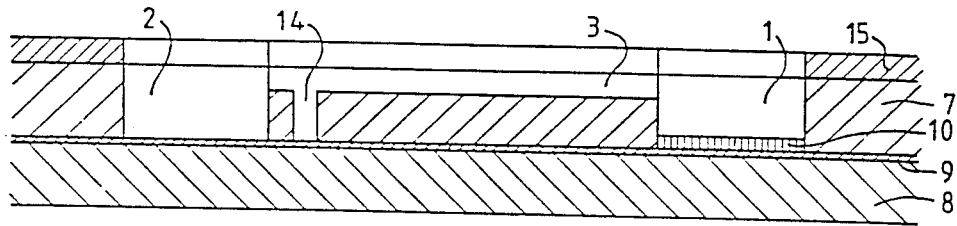

The resist layer defining the conductors is subsequently removed and replaced by a resist 15 patterned to form the capillary channel 3 as shown in FIG. 7.

Figure 8:
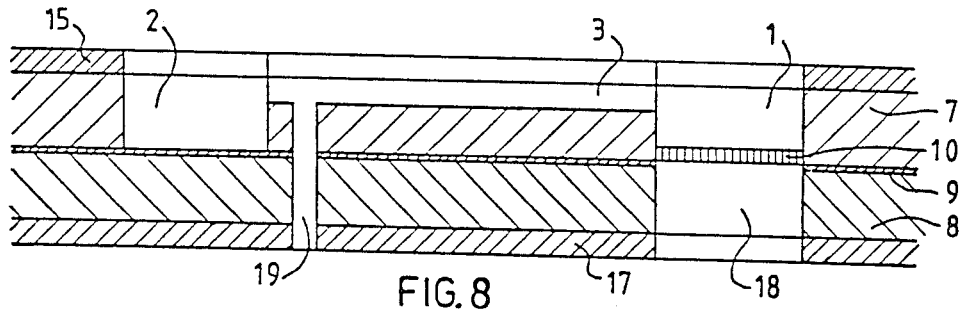
Figure 9:
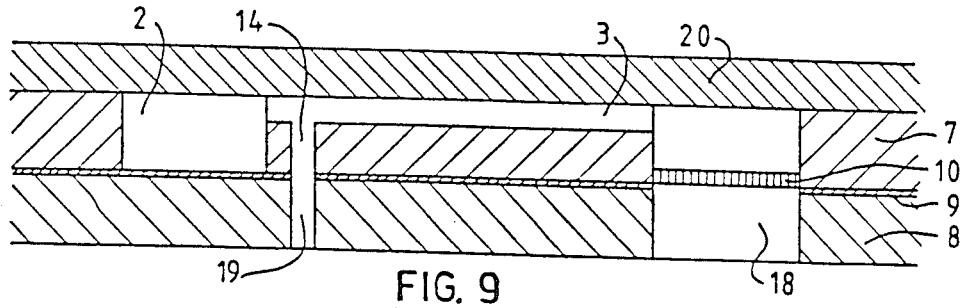

In analogous manner the second face of the wafer is covered with a patterned resist 17 and the lower portion of the charging hole 19 is cut and the second surface 18 of the silicon dioxide layer 10 revealed by etching away the silicon exposed by the resist with silicon etchant. The wafer at this stage is as shown in FIG. 8. Treatment with the silicon etchant is continued for sufficient time to remove the etch stop. The resists 15 and 17 are removed in a conventional manner.

A glass slide 20 is bonded to the surface of the epitaxial silicon layer 7 by conventional charge depletion techniques. The glass slide 20 serves to close the system 1, 2, 3 such that the only communication with the atmosphere is via charging hole 19.

A final stage of manufacture is to insert electrically conducting liquid globule 6 and form plug 21 within the charging hole 19 to hermetically seal the system 1, 2, 3.

Figure 10:
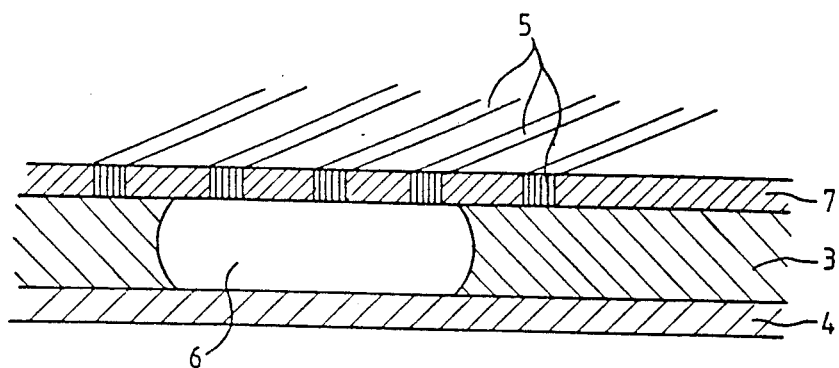
FIG. 10 is a schematic representation of a portion of a preferred embodiment of the present invention.

Referring now to FIG. 10 which shows an expanded view of a portion of the capillary 3 in a preferred embodiment of the invention, the electrically conductive liquid 6 forms a connection between the conductor 4 and a plurality of the conductors 5 thereby completing an electrical circuit. The electrical circuit completed by the electrically conductive liquid 6 may be part of a switching circuit for a pressure measurement device (not shown) or a pressure threshold switch (not shown).

Figure 11:
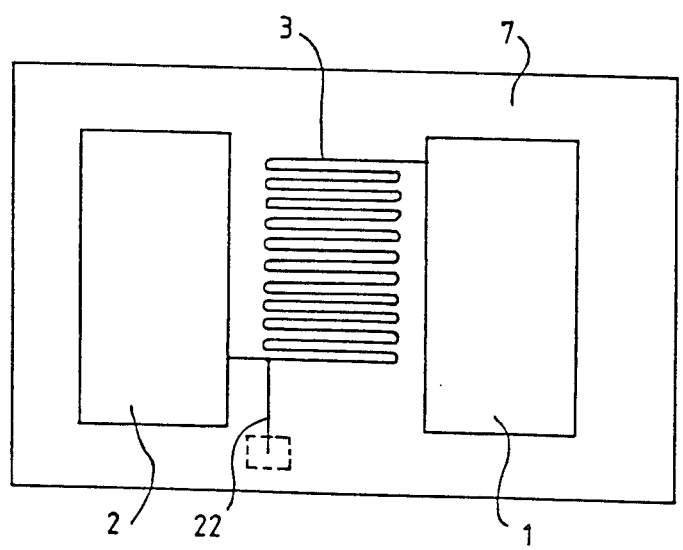
FIG. 11 is a plan view of a preferred embodiment of the present invention.

FIG. 11 is a view of the upper surface of a further preferred embodiment of the present invention with the glass plate 11 removed. The chamber 1 and 2 are of large volume compared to the capillary 3 which is of considerable length to give a comparatively large distance for the electrically conductive liquid to travel thereby giving a similarly large range of pressures over which measurement can be made. The charging hole is seen in the preferred embodiment to be formed on a capillary branch 22 to the capillary 3.

While the invention has been particularly shown and described with reference to a preferred embodiment thereof, it will be understood by those skilled in the art that various other changes in the form and details may be made therein without departing from the spirit and scope of the invention.

Having thus described my invention, what I claim as new, and desire to secure by Letters Patent is:

1. A semiconductor integrated pressure transducer comprising:

a semiconductor substrate incorporating a hermetically sealed system, said sealed system comprising a first chamber communicating with a second chamber via a capillary, said first chamber containing a fluid;

a deformable membrane forming at least one portion of a wall of said first chamber, said deformable membrane separating said fluid within said first chamber from the atmosphere external to said transducer;

said second chamber having rigid walls; a compressible gas contained within said second chamber;

an electrically conductive liquid, said electrically conductive liquid partially filling said capillary, said liquid physically separating said fluid in said first chamber from said gas in said second chamber;

said capillary having a wall, said wall being electrically conductive at least in two separated regions such that in use at a predetermined external atmosphere pressure the electrically conductive liquid makes contact with both of said electrically conductive regions thereby completing an electrical circuit.

2. The pressure transducer of claim 1 wherein said electrically conductive liquid comprises an aqueous ionic solution.

3. The pressure transducer of claim 1 wherein said electrically conductive liquid comprises mercury.

4. The pressure transducer of claim 1 wherein said semiconductor substrate comprises a silicon substrate and wherein said first chamber, said second chamber and said capillary are all integrally formed within said silicon substrate.

* * * * *